(No Model.)
E. M. BENTLEY.
REGULATION OF DYNAMO ELECTRIC MACHINERY.
No. 524,373. Patented Aug. 14, 1894.
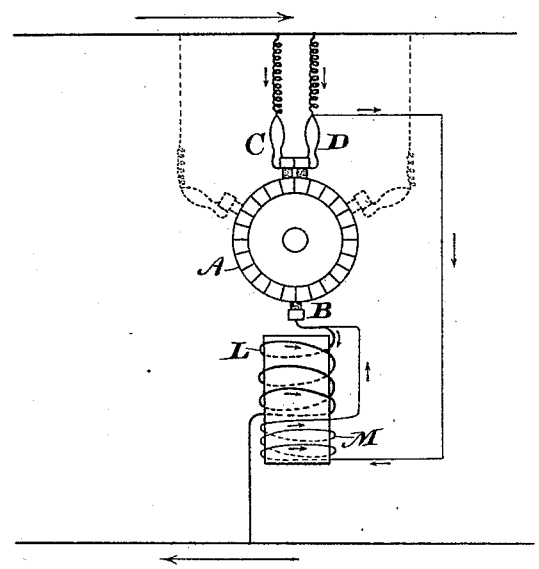
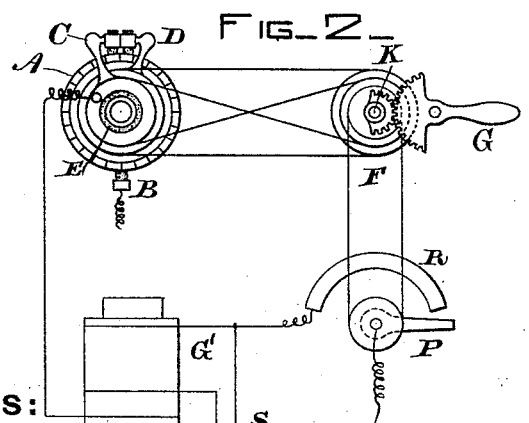
WITNESSES:
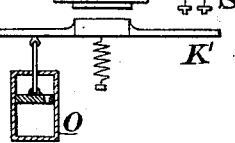
INVENTOR:
Edward M. Bentley
by Bentley & Knight
ATTYS.

UNITED STATES PATENT OFFICE.

EDWARD M. BENTLEY, OF BOSTON, MASSACHUSETTS.

REGULATION OF DYNAMO-ELECTRIC MACHINERY.

SPECIFICATION forming part of Letters Patent No. 524,373, dated August 14, 1894.

Application filed December 26, 1890. Serial No. 375,765. (No model.)

*To all whom it may concern:*

Be it known that I, EDWARD M. BENTLEY, a citizen of the United States, residing at Boston, in the county of Suffolk and State of Massachusetts, have invented a certain new and useful Improvement in the Regulation of Dynamo-Electric Machinery, of which the following is a specification.

My invention consists in a method and apparatus for carrying the method into effect, and is especially applicable to dynamo electric machinery employed for motive power on a constant potential circuit.

The method generally consists in varying the electro-motive force of the machine by bringing into circuit a variable number of active armature coils, in the manner pointed out hereinafter and in connection with motor regulation it may be stated as a method of regulating the speed of an electric motor on a constant potential circuit, which consists in varying at will the counter-electro-motive force of the motor by bringing into circuit in series a variable number of its active armature coils. The apparatus which I employ in connection with this method will appear in the following specification.

Referring to the accompanying drawings, Figure 1 represents in diagram, the apparatus which I employ, and Fig. 2 shows the means I use for moving simultaneously the commutator contacts, and also a device for preventing an excessive current in the machine at starting.

In the figures, A represents the commutator of a dynamo electric machine, which has a series of segments understood to be connected in the usual manner to corresponding coils of the armature. Upon this commutator are placed three contact brushes of any well known type, one of the three B, being the negative brush, and the other two C and D placed normally at a point on the commutator diametrically opposite the brush B, and connected to the same line conductor, and constituting duplicate positive contacts.

It will be readily understood that with the two brushes C and D in the position shown by the full lines Fig. 1, the machine will be giving its maximum electro-motive force, and as a motor (the impressed electro-motive force being constant) the speed of the motor will be at a minimum. Starting with this arrangement, I regulate the electro-motive force by moving the two brushes C and D simultaneously and equally in opposite directions from their normal position as indicated by the dotted lines, until a sufficient number of the armature coils are removed from the series or rendered inactive, and the electro-motive force reduced to any desired degree. This will cause the machine when used as a motor to increase its speed until a maximum is reached.

In Fig. 2 are illustrated mechanical devices which I employ for simultaneously moving the commutator brushes. In this arrangement, the brushes C and D are carried respectively by two metallic disks in contact with each other, placed on the armature shaft so as to be rotated thereon but insulated therefrom by the material E. On a separate shaft K are placed two connected disks F, corresponding in size to those above mentioned, and belted thereto correspondingly by means of cords passing over grooves in the peripheries of the disks. One of these belts will be crossed so as to produce a motion reverse to that produced by the other.

Any suitable means may be employed for rotating the disks, as for example, a toothed segment G, engaging with a corresponding pinion attached to the disks.

It will be understood that any movement of G will produce an opposite movement of the brushes C and D away from the central point of the commutator, so as to effect the regulation described with reference to Fig. 1.

In addition to the regulation produced by the movement of the brushes C and D, I may, in the case of a motor, still further provide means for varying at the same time the field magnet strength reducing it when a high speed is desired, and increasing it for lower speeds. This may be conveniently accomplished by means of a combined field magnet winding, as illustrated in Fig. 1. In this figure, the field magnet is shown provided with a series coil L and a shunt coil M; the latter having one terminal connected to stationary brush B and the other terminal connected to one of the movable brushes C and D. By this provision, the shunt coil M will have its maximum strength when the minimum speed is required and the movable brushes are in the position shown by full lines. As the brushes are moved however, the difference of potential between the terminals of coil M will be gradually reduced and the total field magnet strength thereby diminished, as the speed of the motor increases.

Any other equivalent means may be employed to include or remove any desired number of active armature coils, and equivalent devices may be employed for varying simultaneously therewith the field magnet strength inversely as the speed of the motor.

In order to prevent too great a flow of current through the motor when the circuit is first closed, and thus to afford a supplementary step in the regulation, I employ the device illustrated in the lower part of Fig. 2. This consists of a circuit closer, and a resistance or choking coil which is first thrown into the circuit to hold back the current, and is then automatically thrown out, after the motor has gotten under way. The circuit closer consists of a switch arm P, adapted to be operated by the movement of lever G to make contact with plate R. This closes the circuit, which will then extend through the choking coil G, to the motor.

The operation of this device is as follows:— The circuit of the motor is first closed, and the coil G, which consists of a high resistance wire wound upon a heavy iron core, brought into circuit. The self induction of this core and its resistance, will hold back the main current and prevent too great a flow until the motor has attained a certain speed. By this time, the coil G' will have attracted its armature K against the force of a retractile spring and dash-pot O, and will close the circuit at S, so as to short circuit the principal part of coil G', a small section of the coil being left in circuit to hold up the armature. After the coil has been removed from circuit, the regulation of the motor will be continued by the means above described.

It has heretofore been customary in the regulation of motors, to first introduce a resistance, which not only prevented a sudden flow of current, but adjusted as desired, the amount of current admitted to the motor, further regulation being accomplished by reducing the field magnet strength of the motor, until a maximum speed was obtained.

My invention avoids the use of a resistance wastefully employed, and also obviates manipulation of the field magnet coils. It also has the advantage of providing two forms of motor regulation, viz., a resistance for the first step and manipulation of the motor circuit for the second step, while at the same time, one of these steps is accomplished automatically, and it is only necessary to provide manual devices for effecting the second step. This latter advantage will be recognized as important, when it is considered that in the present arrangements for regulating the speed of motors on a constant potential circuit, the operating lever must first act upon the resistance and then upon the switch or other device employed for altering the counter-electro-motive force of the motor. This in practice, results in a complicated mechanical construction to secure the proper consecutive action of the two regulating elements.

What I claim as new, and desire to secure by Letters Patent, is—

1. The method of regulating the speed of an electric motor on a constant potential circuit which consists in varying the number of active armature coils included in series in the circuit to correspond with changed conditions of running, and thereby effecting and maintaining an adjustment of the counter-electro motive force of the motor resulting in the desired speed at a given load.

2. The method of regulating the speed of an electric motor on a constant potential circuit, which consists in varying the counter-electro-motive force in two ways, first, by including in circuit a greater or less number of active armature coils in series, and second, by varying the field magnet strength inversely to the speed of the motor.

3. The method of regulating an electric motor on a constant potential circuit, which consists in varying the counter-electromotive force by simultaneously varying the field magnet strength, and including a greater or less number of active armature coils in series.

4. The combination with an electric motor on a constant potential circuit, of movable commutator brushes, and means for adjusting the same around the commutator to include in the circuit a greater or less number of armature coils in series.

5. The method of regulating a dynamo-electric machine which consists in removing a greater or less number of armature coils from active operation, by shifting the point of connection to one terminal of the circuit correspondingly on both sides of the commutator, while maintaining the other terminal at the line of commutation, and thereby preserving equal the numbers of coils in series on each side of the armature which are included between the terminals.

6. The combination in a dynamo-electric machine or motor of a stationary contact at one extremity of the diameter of commutation forming one terminal of the main circuit and a divided movable contact at the other extremity of such diameter forming the only other main circuit terminal.

7. In a dynamo-electric machine, the combination with a stationary contact at one extremity of the diameter of commutation forming one terminal of the main circuit, of two movable contacts at the other extremity of the diameter which together form the only other main circuit terminal, and means for shifting the two movable contacts simultaneously and oppositely around the commutator and thus including in series in the circuit a greater or less number of armature coils.

8. The combination with the commutator of a dynamo electric machine of a stationary contact forming a terminal of the circuit, two movable contacts forming the opposite terminal of the circuit, a field magnet coil in series with the armature, and a second field magnet coil having one terminal connected to the said stationary contact, and the other terminal connected to one of the two movable contacts.

9. The combination in a dynamo-electric machine of an armature having a commutator, a stationary brush upon the extremity of the diameter of commutation and a divided movable brush at the other extremity thereof, a field-magnet and a shunt coil thereon, one terminal of such shunt coil being connected to the stationary contact which also forms the main circuit terminal, and the other terminal of the shunt coil being connected to the divided contact forming the other terminal of the main circuit.

10. In a motor regulator the combination with a circuit closer of a choking coil adapted to be included in the motor circuit, means for automatically cutting out the said coil and additional means for varying the counter-electro-motive force of the motor.

In witness whereof I have hereunto set my hand this 19th day of December, 1890.

EDWARD M. BENTLEY.

Witnesses:
A. O. ORNE,
E. L. RAWSON.